United States Patent
Busch et al.

(10) Patent No.: US 12,256,747 B2
(45) Date of Patent: Mar. 25, 2025

(54) SCRAPER AND PROCESSING LINE FOR CLEANING THE NECK OF POULTRY

(71) Applicant: Meyn Food Processing Technology B.V., Oostzaan (NL)

(72) Inventors: Cornelis Busch, Oostzaan (NL); Stefan Christiaan Semuel Dane, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 26 days.

(21) Appl. No.: 18/241,610

(22) Filed: Sep. 1, 2023

(65) Prior Publication Data

US 2024/0074446 A1    Mar. 7, 2024

(30) Foreign Application Priority Data

Sep. 5, 2022 (NL) .................................... 2032952

(51) Int. Cl.
   *A22C 21/00*    (2006.01)
   *A22C 21/06*    (2006.01)

(52) U.S. Cl.
   CPC .................................. *A22C 21/06* (2013.01)

(58) Field of Classification Search
   CPC ..................................................... A22C 21/06
   USPC ................................................ 452/106–109
   See application file for complete search history.

(56) References Cited

U.S. PATENT DOCUMENTS

| | | | |
|---|---|---|---|
| 5,167,568 A * | 12/1992 | Esbroeck | A22B 5/0094 452/116 |
| 5,222,905 A | 6/1993 | Van Den Nieuwelaar | |
| 6,027,403 A * | 2/2000 | Hazenbroek | A22C 21/06 452/117 |
| 6,213,864 B1 | 4/2001 | Griffiths | |
| 2005/0186895 A1 | 8/2005 | Winkelmolen | |

FOREIGN PATENT DOCUMENTS

| | | |
|---|---|---|
| EP | 0178825 A1 | 4/1986 |
| EP | 0516888 A1 | 12/1992 |
| EP | 0838156 A2 | 4/1998 |
| EP | 1048214 B1 | 11/2000 |
| EP | 2299834 A1 | 3/2011 |

OTHER PUBLICATIONS

NL Search Report, 8 pages, Sep. 5, 2022.

* cited by examiner

*Primary Examiner* — Richard T Price, Jr.
(74) *Attorney, Agent, or Firm* — Dority & Manning, P.A.

(57) ABSTRACT

A scraper for removing undesired parts from a neck area of slaughtered poultry can include a mandrel and forwardly directed projections that are arranged to operate during use in the neck area of the slaughtered poultry, wherein the forwardly directed projections form part of at least one plate, and wherein while being mounted on the mandrel the at least one plate is movable relative to the mandrel.

15 Claims, 6 Drawing Sheets

SCRAPER AND PROCESSING LINE FOR CLEANING THE NECK OF POULTRY

PRIORITY STATEMENT

The present application claims priority under 35 U.S.C § 119 to Dutch Patent Application No. 2032952, filed on Sep. 5, 2022.

FIELD OF THE INVENTION

The subject matter of the present disclosure relates generally to a scraper for removing undesired parts from a neck area of slaughtered poultry

BACKGROUND OF THE INVENTION

A scraper is known from EP-A-0 178 825 dating back to 1984. Since 1984, the development of such scrapers has been continued, which is evidenced by publications like U.S. Pat. No. 5,222,905 (1992), FIG. 3A of EP-A-0 838 156 (1997), U.S. Pat. No. 6,213,864 (1999), EP-B-1 048 214 (1999), US2005/0186895 (2014) and EP-B-2 299 834 (2009).

US 2010/273407 discloses a scraper for removing undesired parts from a neck area of slaughtered poultry, in particular for removing a windpipe and gullet with craw from the neck area of the slaughtered poultry. The scraper includes a mandrel and forwardly directed projections that are arranged to operate during use in the neck area of the slaughtered poultry. The forwardly directed projections form part of at least one plate. The at least one plate is mounted or mountable on the mandrel.

Despite continuous efforts through the decades since 1984, the industry has failed to provide an effective solution for the problem in that the operation to remove undesired parts from the neck area of slaughtered poultry is not always satisfactory. Unsatisfactory results in which undesired parts remain after the operation in the neck area of the slaughtered poultry may for instance be caused by the fact that not all poultry has the same dimensions. Also, the strength of the tissue that must be broken during the execution of the cleaning process may differ from one animal to the next.

BRIEF DESCRIPTION OF THE INVENTION

It one exemplary aspect, an object of the invention to provide a solution for the above-mentioned problems.
In one exemplary embodiment, the invention relates a scraper for removing undesired parts from a neck area of slaughtered poultry and in particular for removing a windpipe and gullet with craw from the neck area of the slaughtered poultry. The scraper includes a mandrel and forwardly directed projections that are arranged to operate during use in the neck area of the slaughtered poultry.

In an exemplary aspect, a novel design scraper is proposed with the features of one or more of the appended claims. The invention may also be embodied in an exemplary processing line for processing poultry, in particular for removing undesired parts from a neck area of such slaughtered poultry. This exemplary embodiment of the invention may include a carousel device and a conveyor line with carriers for suspending the slaughtered poultry by the legs. The conveyor line guides the suspended poultry along the carousel device. The carousel device can be provided with a scraper with the features of one or more of the appended claims.

In an exemplary embodiment, the scraper of the invention may include a mandrel and forwardly directed projections that are arranged to operate during use in the neck area of the slaughtered poultry. The forwardly directed projections can form part of at least one plate, wherein the at least one plate is mounted or mountable on the mandrel. While being mounted on the mandrel, the at least one plate is movable relative to the mandrel.

The shape of the plate is not essential and, for example, the at least one plate may be straight or may be curved. With the movability of the plate, which is provided with the projections relative to the mandrel, it is possible in exemplary aspects to position the projections that execute the scraping action in the neck area of the poultry to a point that they are most effective. Further because the plate can be movable with respect to the mandrel, the scraper of exemplary embodiments of the invention can be easily tailored to the dimensions of the poultry to be processed.

For reasons of effectiveness, in exemplary aspects it may be preferred that the scraper is provided with two plates, wherein each of the two plates is provided with the forwardly directed projections, and that while being mounted on the mandrel, the two plates are each movable relative to the mandrel.

In another exemplary aspect, it may be most convenient that the two plates are mounted or mountable on opposite sides of the mandrel. This provides that the forces that are exerted by the forwardly directed projections of the two plates on the inner neck skin of the poultry balance each other out. This can keep the poultry in a steadily suspended position during the cleaning operation.

In another exemplary aspect, it can be cost effective to provide that the plate or plates are flat in a region where the projections are provided. Manufacturing costs can then be kept low.

In another exemplary aspect, suitably the projections may be provided behind each other in a longitudinal direction of the plate or plates, each of the projections having a forward pointing blunt end portion. This arrangement has proven to be most effective from an operational point of view.

Desirably the plate or plates may be movable in a direction transversely to a longitudinal direction of the mandrel, which further promotes the ease of adjustment of the scraper of the invention to the dimensions of the poultry to be processed. This may be embodied by arranging that the plate or plates are movable in a longitudinal direction of the mandrel and simultaneously in a direction transversely to the longitudinal direction of the mandrel.

The exemplary scraper of the invention may be construed in different ways, but in one exemplary aspect it may be preferred that the plate or plates are mounted on movable pins of the mandrel, the pins extending through first slits that are obliquely oriented with respect to the longitudinal direction of the mandrel. The obliquely oriented first slits of the mandrel can cause the pins to execute at least a motion in a direction transversely to the longitudinal direction of the mandrel when the pins are driven in the longitudinal direction of the mandrel.

For driving the movable pins of the mandrel, in some exemplary embodiments the mandrel has a hollow portion for housing a longitudinally movable driving rod.

The driving connection between the longitudinally movable driving rod and the movable pins of the mandrel may be arranged by providing that the driving rod has second slits transversely oriented with respect to the longitudinal direction of the driving rod, through which second slits the movable pins of the mandrel extend.

The mounting of the plate or plates of the mandrel may be enabled by the feature that each of the plates is provided with apertures in which the movable pins of the mandrel snugly fit.

Each plate may have at least two apertures in which the movable pins of the mandrel snugly fit, wherein the at least two apertures are provided on opposite ends of the mandrel.

It is further remarked that, in another exemplary aspect, the invention may also be embodied in a processing line for processing poultry, in particular for removing undesired parts from a neck area of such slaughtered poultry. This may include a carousel device and a conveyor line with carriers for suspending the slaughtered poultry by the legs, which conveyor line guides the suspended poultry along the carousel device, and wherein the carousel device is provided with a scraper according to the invention.

The carousel device may be provided with a first track and a second track, wherein the longitudinally movable driving rod is connected to a first wheel which is guided in the first track and wherein the mandrel is connected to a second wheel guided in the second track such that the at least one plate is movable relative to the mandrel by a relative movement of the first wheel with respect to the second wheel.

In one exemplary embodiment, carousel device may include a first carousel unit provided with the first track and a second carousel unit provided with the second track, wherein the first carousel unit and the second carousel unit are movable up and down relative to each other. This can provide the advantage that the vertical distance between these two carousel units may be adjusted depending on the flock. Thus, if a flock with predominantly larger poultry is to be processed, the distance between these two carousel units may be increased by lowering the second carousel unit relative to the first carousel unit. In this way the plates can be slightly open at the start of the process.

The processing line may include a drive (e.g., a hydraulic system that controls the vertical height of the second carousel unit) to adjust a distance between the first carousel unit and the second carousel unit.

The apparatus of the invention is therefore provided with features according to one or more of the appended claims. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of a scraper and carousel device according to the invention that is not limiting as to the appended claims.

In the drawings.

Whenever in the figures the same reference numerals are applied, these numerals refer to the same parts.

DETAILED DESCRIPTION

Figure 1:
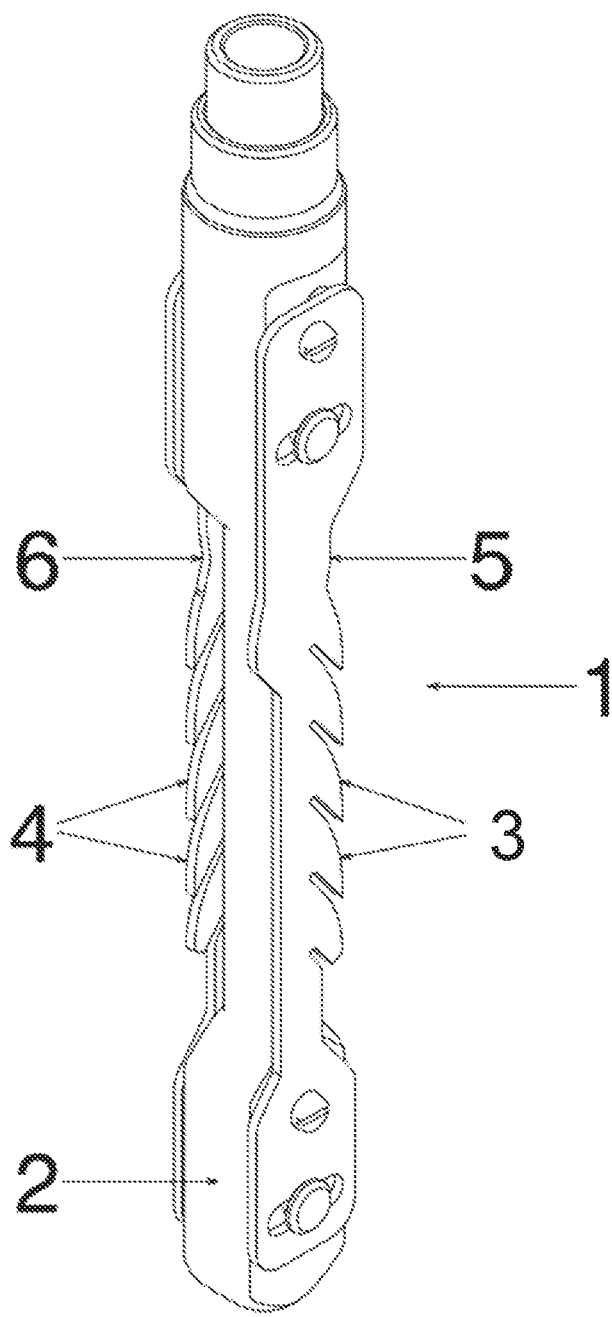
FIG. 1 shows an exemplary scraper of the invention in an isometric view.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

Figure 2:
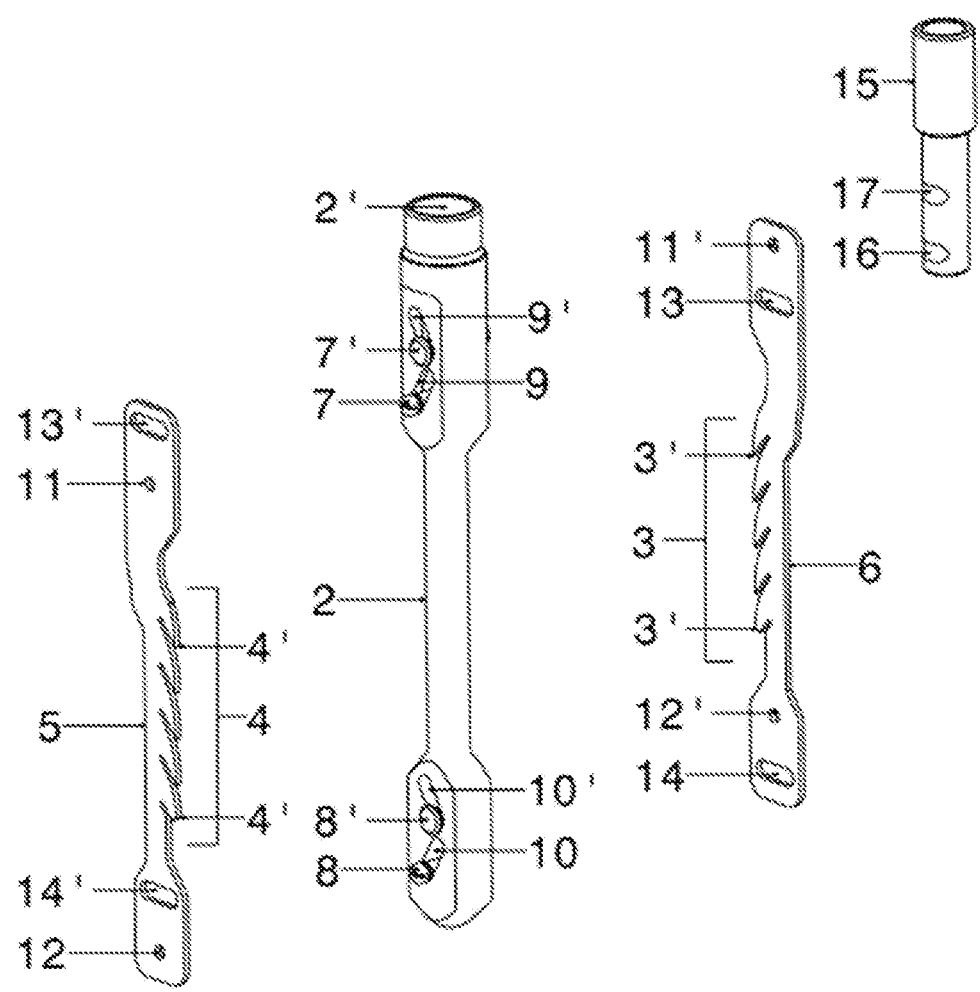
FIG. 2 shows the exemplary scraper of the invention in an exploded view.

Turning first to FIG. 1 and FIG. 2, it shows a scraper 1 for removing undesired parts from a neck area of slaughtered poultry, in particular for removing a windpipe and gullet with craw from the neck area of the slaughtered poultry.

The scraper 1 of this exemplary embodiment includes a mandrel 2 and forwardly directed projections 3, 4 that are arranged to operate during use from inside the neck and in the neck area of the slaughtered poultry, and amongst others on the neck skin.

For this exemplary embodiment, the scraper is at least provided with one straight or curved plate, hut preferably provided with two such plates 5, 6 as is shown in the figures, wherein each of the two plates 5, 6 is provided with the forwardly directed projections 3, 4, and the two plates 5, 6 are each movably mounted or mountable on the mandrel 2. "Movably mounted or mountable on the mandrel" means that the plate or plates 5, 6 can move relative to the mandrel 2 whilst the plate or plates 5, 6 are mounted on the mandrel 2. The two plates 5, 6 are preferably mounted or mountable on opposite sides of the mandrel 2, as is shown in the figures.

FIG. 2 shows most clearly that the plate or plates 5, 6 are preferably flat in a region where the projections 3, 4 are provided, for this exemplary embodiment.

It is clear from all figures that the projections 3, 4 are provided behind each other in a longitudinal direction of the plate or plates 5, 6, wherein each of the projections 3, 4 have a forward pointing end portion 3', 4', which is preferably blunt.

Figure 3:
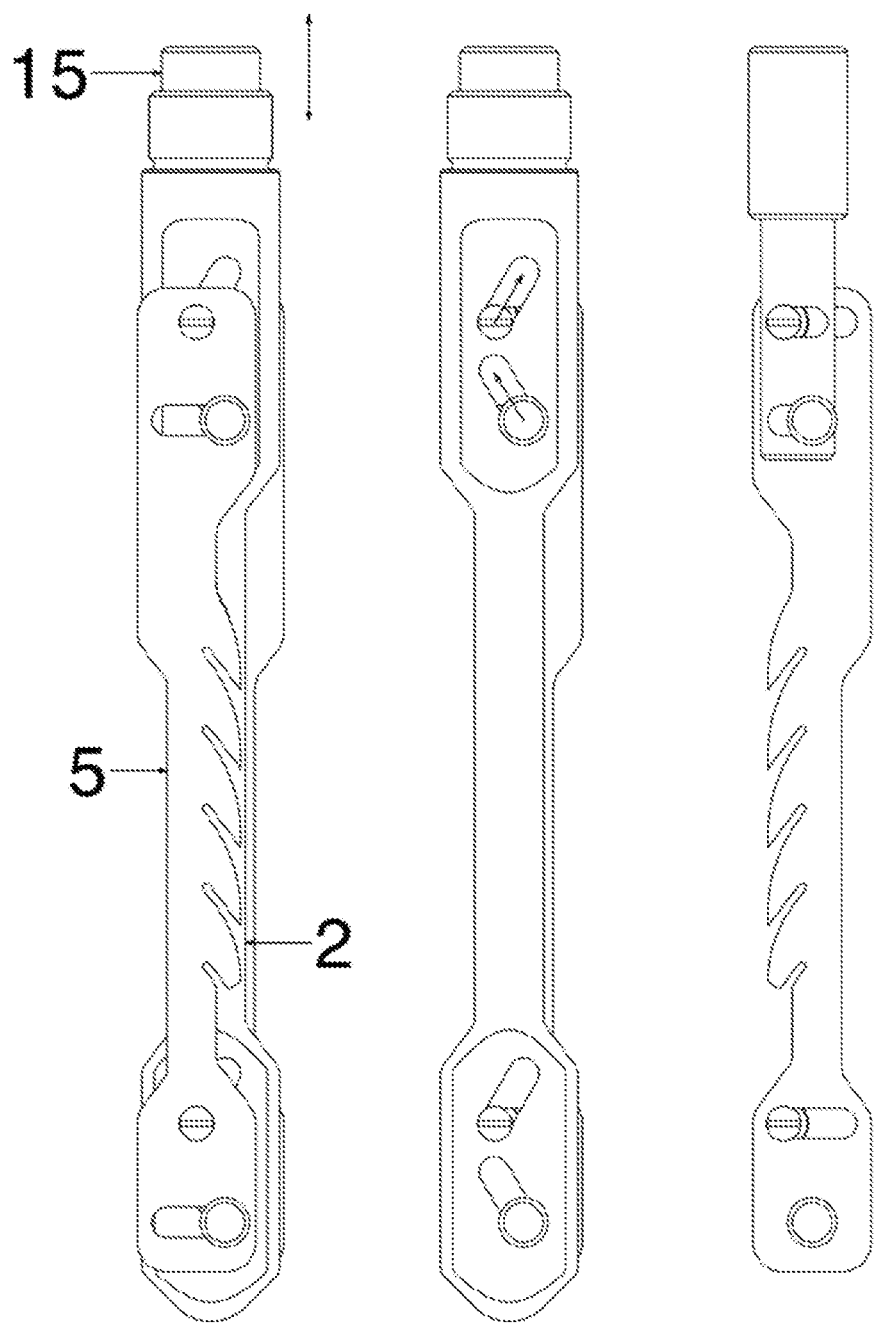
FIGS. 3, 4 and 5 show the exemplary scraper of the invention for operating on small, medium, and large poultry respectively.
Figure 4:
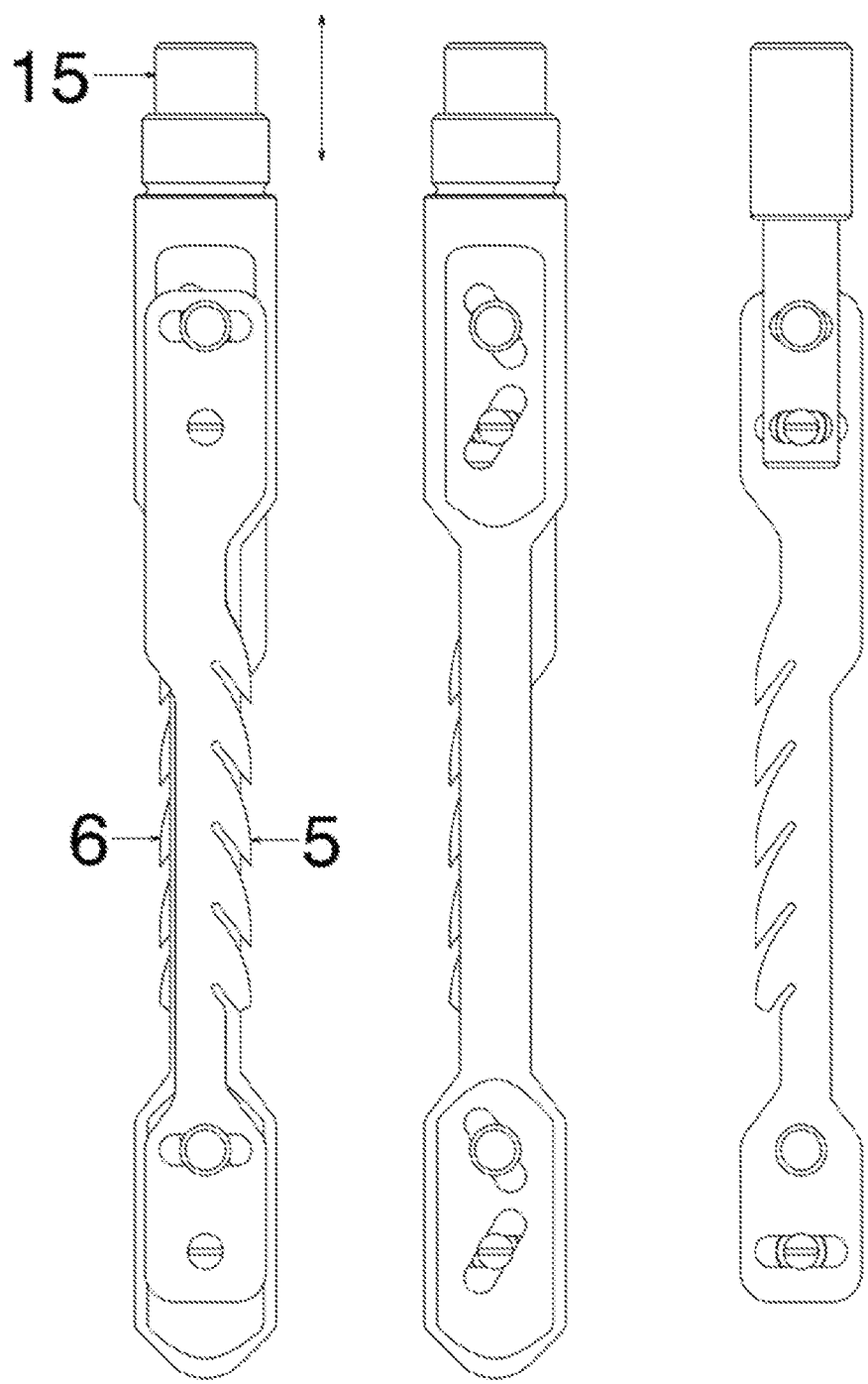
Figure 5:
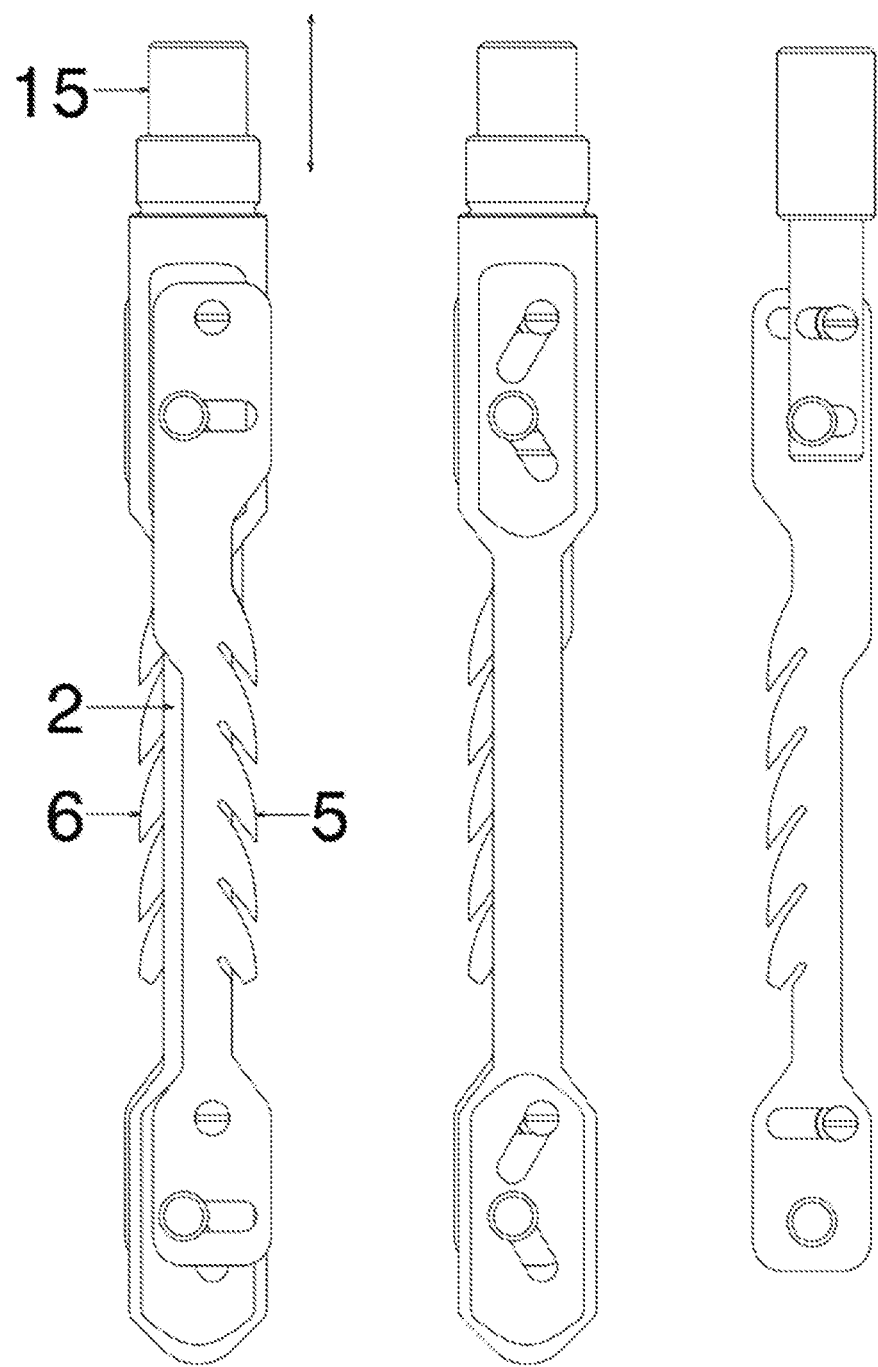

By comparing FIGS. 3, 4 and 5, it is clear that the plate or plates 5, 6 are movable with respect to the mandrel 2. When the scraper 1 of this exemplary embodiment of the invention is arranged for processing poultry of small dimensions as depicted in FIG. 3, the projections 3, 4 are positioned with reference to the mandrel 2 so that they do not extend beyond the edges of the central mandrel 2.

When the scraper 1 of this exemplary embodiment is intended to process medium-sized poultry, the projections 3, 4 of the scraper extend a little beyond the edges of the central mandrel 2 as depicted in FIG. 4, and the projections 3, 4 of the scraper extend to the largest extent beyond the edges of the central mandrel 2 when the scraper is intended to process relatively large poultry. This latter arrangement is shown in FIG. 5.

To tailor the scraper 1 of this exemplary embodiment and others to the different dimensions of the poultry to be processed, the plate or plates 5, 6 are movable in a direction transversely to a longitudinal direction of the mandrel 2.

This is clear from comparing FIGS. 3, 4, 5. In the shown exemplary construction, this is realized by arranging that the plate or plates 5, 6 are movable in a longitudinal direction of the mandrel 2 and simultaneously in a direction transversely to the longitudinal direction of the mandrel 2, which is realized with features of the scraper 1 which will be discussed hereinafter.

As is clear from all figures, but may be best understood from the exploded view shown in FIG. 2, the front side plate 5 is mounted on a first set of movable pins 7, 8 of the mandrel 2, and the backside plate 6 is mounted on a second set of movable pins 7', 8' of the mandrel 2.

The pins 7, 8 supporting the front side plate 5 extend through a set of first slits 9, 10 that are obliquely oriented with respect to the longitudinal direction of the mandrel 2, whereas the pins 7', 8' supporting the backside plate 6 extend through another set of first slits 9', 10' that are obliquely oriented with respect to the longitudinal direction of the mandrel 2.

The front side plate 5 that is mounted on the pins 7, 8 is provided with apertures 11, 12 in which the first set of movable pins 7, 8 of the mandrel 2 snugly fit. The at least two apertures 11, 12 are provided on opposite ends of the mandrel 2. Correspondingly the backside plate 6 that is mounted on the second set of movable pins 7', 8' is provided with apertures 11', 12' in which the second set of movable pins 7', 8' of the mandrel 2 snugly fit. The at least two apertures 11', 12' are provided on opposite ends of the mandrel 2.

The exemplary construction as just elucidated provides that when the pins 7, 8 supporting the front side plate 5 are driven in the longitudinal direction of the mandrel 2, the obliquely oriented first slits 9, 10 of the mandrel 2 cause the pins 7, 8 to execute an obliquely oriented motion which also determines the motion of the front side plate 5 with respect to the mandrel 2. At the same time the first set of movable pins 7, 8 extend also through slits 13, 14 that are provided in the backside plate 6, that is oppositely positioned with respect to the mandrel 2. These slits 13, 14 in the backside plate 6 provide room for moving the pins 7, 8 supporting the front side plate 5 without affecting the position of the backside plate 6. Accordingly driving the pins 7, 8 thus provides the motion of the front side plate 5 only.

A corresponding and similar exemplary construction as discussed in the previous paragraph is provided for moving the backside plate 6 in concert with the motion of the front side plate 5, to note: When the pins 7', 8' supporting the backside plate 6 are driven in the longitudinal direction of the mandrel 2, the obliquely oriented first slits 9', 10' of the mandrel 2 cause the pins 7', 8' to execute an obliquely oriented motion with reference to the longitudinal direction of the mandrel 2 which also determines the motion of the backside plate 6 with respect to the mandrel 2. At the same time the second set of movable pins 7', 8' extend also through slits 13', 14' that are provided in the front side plate 5, that is oppositely positioned with respect to the mandrel 2. These slits 13', 14' in the front side plate 5 provide room for moving the pins 7', 8' supporting the backside plate 6 without affecting the position of the front side plate 5. Accordingly driving the pins 7', 8' thus provides the motion of the backside plate 6 only.

Driving the first set of pins 7, 8 and the second set of pins 7', 8' is preferably brought about by arranging that the mandrel 2 has a hollow portion 2' for housing a longitudinally movable driving rod 15. The driving rod 15 has second slits 16, 17 transversely oriented with respect to the longitudinal direction of the driving rod 15, through which second slits 16, 17 the first set of movable pins 7, 8 and the second set of movable pins 7', 8' of the mandrel 2 extend.

Moving the driving rod 15 up or down drives the pins 7, 8 supporting the front side plate 5 and drives the pins 7', 8' supporting the backside plate 6 in an oblique direction as defined by the orientation of the slits 9, 10 for the front side plate 5 and by the orientation of the slits 9', 10' for the backside plate 6. Since indeed the front side plate 5 and the backside plate 6 are mounted on the pins 7, 8 and 7', 8', respectively, the front side plate 5 executes a motion as defined by the first set of movable pins 7, 8, and the backside plate 6 executes a simultaneous motion as defined by the second set of movable pins 7', 8'.

Figure 6:
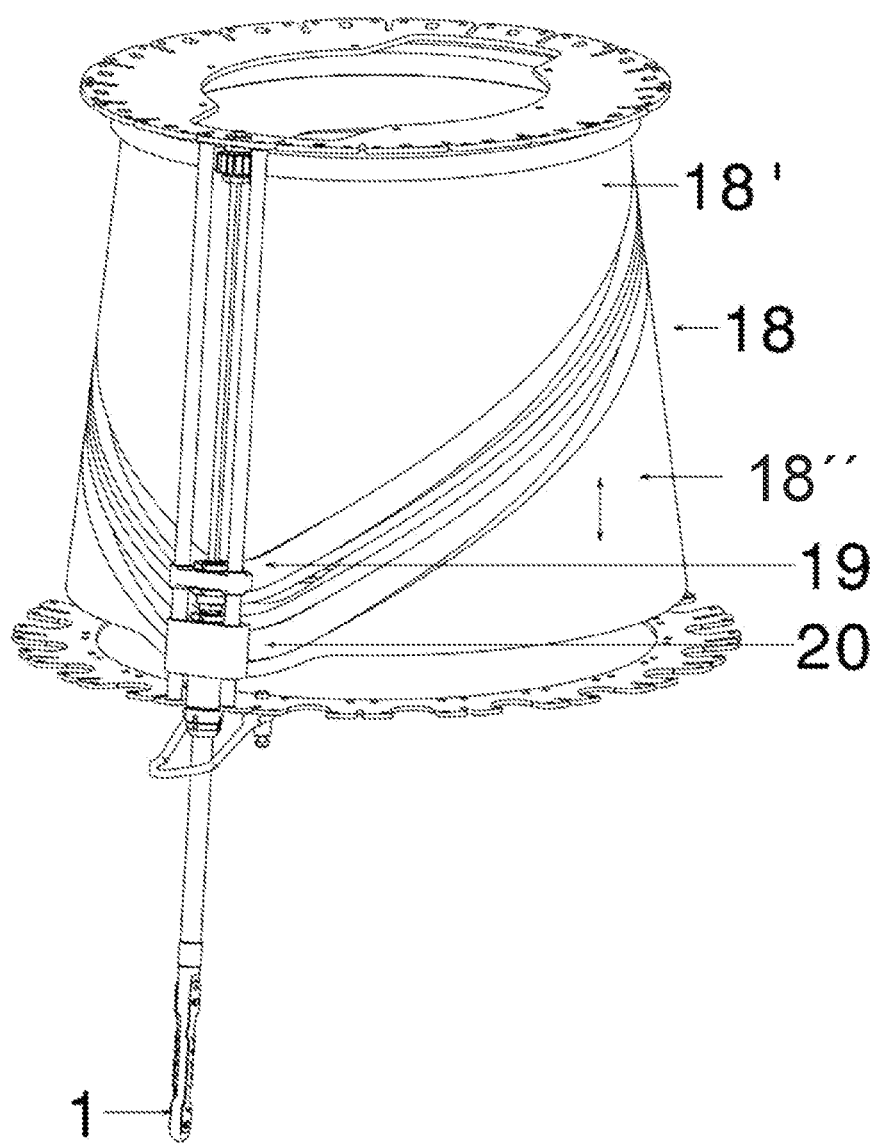
FIG. 6 shows an exemplary carousel device equipped with an exemplary scraper according to the invention.

FIG. 6 finally shows an exemplary carousel device 18 which may be assembled together with a conveyor line with carriers for suspending slaughtered poultry by the legs, which conveyor line guides the suspended poultry along this carousel device 18. FIG. 6 depicts that the carousel device 18 is provided with the exemplary scraper 1 according to the invention.

FIG. 6 further shows that the carousel device 18 is provided with a first track 19 and a second track 20, wherein the longitudinally movable driving rod 15 is connected to a first wheel which is guided in the first track 19 and wherein the mandrel 2 is connected to a second wheel guided in the second track 20.

FIG. 6 further depicts that the carousel device 18 comprises a first carousel unit 18' provided with the first track 19 and a second carousel unit 18" provided with the second track 20, wherein the first carousel unit and the second carousel unit are movable up and down relative to each other. For this purpose the processing line comprises a drive to adjust a distance between the first carousel unit 18' and the second carousel unit 18". The manner of implementation of the drive is not shown since this is clear for the skilled person. In this way, the at least one plate 5, 6 is movable relative to the mandrel 2 by a relative movement of the first wheel with respect to the second wheel caused by a change of the distance between the first carousel unit 18' and the second carousel unit 18".

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A scraper for removing a windpipe and gullet with craw from the neck area of a slaughtered poultry, comprising:
a mandrel and forwardly directed projections that are arranged to operate during use in the neck area of the slaughtered poultry, wherein the forwardly directed projections form part of at least one plate, wherein the at least one plate is mounted or mountable on the mandrel, wherein while mounted on the mandrel the at least one plate is movable relative to the mandrel.

2. The scraper of claim 1, wherein the scraper is provided with two plates, wherein each of the two plates is provided with forwardly directed projections and that while being mounted on the mandrel, the two plates are each movable relative to the mandrel.

3. The scraper of claim 2, wherein the two plates are mounted or mountable on opposite sides of the mandrel.

4. The scraper of claim 2, wherein the plate or plates are flat in a region where the projections are provided.

5. The scraper of claim 2, wherein the projections are provided behind each other in a longitudinal direction of the plate or plates, each of the projections having a forward pointing blunt end portion.

6. The scraper of claim 1, wherein the plate or plates are movable in a direction transversely to a longitudinal direction of the mandrel.

7. The scraper of claim 1, wherein the plate or plates are mounted on movable pins of the mandrel, said pins extending through first slits that are obliquely oriented with respect to the longitudinal direction of the mandrel, wherein the obliquely oriented first slits of the mandrel cause the pins to at least execute a motion transversely to the longitudinal direction of the mandrel when the pins are driven in the longitudinal direction of the mandrel.

8. The scraper of claim 7, wherein each of the plates is provided with apertures in which the movable pins of the mandrel snugly fit.

9. The scraper of claim 8, wherein each plate has at least two apertures in which the movable pins of the mandrel snugly fit, wherein the at least two apertures are provided on opposite ends of the mandrel.

10. The scraper of claims 1, wherein the mandrel has a hollow portion for housing a longitudinally movable driving rod.

11. The scraper of claim 10, wherein the driving rod has second slits transversely oriented with respect to the longitudinal direction of the driving rod, through which second slits the movable pins of the mandrel (2) extend.

12. A processing line for processing poultry, comprising a carousel device and a conveyor line with carriers for suspending slaughtered poultry by the legs, the conveyor line guiding the suspended poultry along the carousel device, wherein the carousel device is provided with a scraper according claim 1.

13. A processing line according to claim 12, wherein the carousel device comprises a first track and a second track, wherein the longitudinally movable driving rod is connected to a first wheel that is guided in the first track and wherein the mandrel is connected to a second wheel guided in the second track such that the at least one plate is movable relative to the mandrel by a relative movement of the first wheel with respect to the second wheel.

14. A processing line according to claim 13, wherein the carousel device comprises a first carousel unit provided with the first track and a second carousel unit provided with the second track, wherein the first carousel unit and the second carousel unit are movable up and down relative to each other.

15. A processing line according to claim 14, wherein the processing line comprises a drive to adjust a distance between the first carousel unit and the second carousel unit.

* * * * *